Oct. 16, 1951  V. S. POWELL  2,571,609
LICENSE AND KEY CONTAINER
Filed Feb. 24, 1950  2 SHEETS—SHEET 1

Virgil S. Powell
INVENTOR.

Oct. 16, 1951   V. S. POWELL   2,571,609
LICENSE AND KEY CONTAINER
Filed Feb. 24, 1950   2 SHEETS—SHEET 2

Virgil S. Powell
INVENTOR.

Patented Oct. 16, 1951

2,571,609

UNITED STATES PATENT OFFICE 2,571,609

LICENSE AND KEY CONTAINER

Virgil S. Powell, Cedar Rapids, Iowa

Application February 24, 1950, Serial No. 145,955

3 Claims. (Cl. 150—40)

This invention comprises novel and useful improvements in a license and key container and more specifically pertains to a motor vehicle operator's container for accessibly receiving a motor vehicle operator's license and a motor vehicle ignition key therein.

The principal object of this invention is to provide a compact and attractive container for receiving and retaining a motor vehicle operator's license and other similar or pertinent material, in assembly with a motor vehicle ignition key in an improved manner which will display and render accessible simultaneously the license and the key, or store and retain the same as desired.

A further important object of the invention is to provide a container having a panel slidable therein and extensible through an opening thereof for selectively exhibiting for inspection and use an operator's license and ignition key.

Yet another object of the invention is to provide an improved container as set forth in the preceding objects which may be conveniently and economically constructed of a pliable material, may be flat and compact, and is provided with combined stiffening, reinforcing, panel guiding and panel retaining members.

These, together with various ancillary features and objects of the invention which will later become apparent as the following description proceeds, are attained by the present invention, the preferred embodiment of which has been illustrated by way of example only in the accompanying drawings, wherein.

Figures 1, 2, 3:
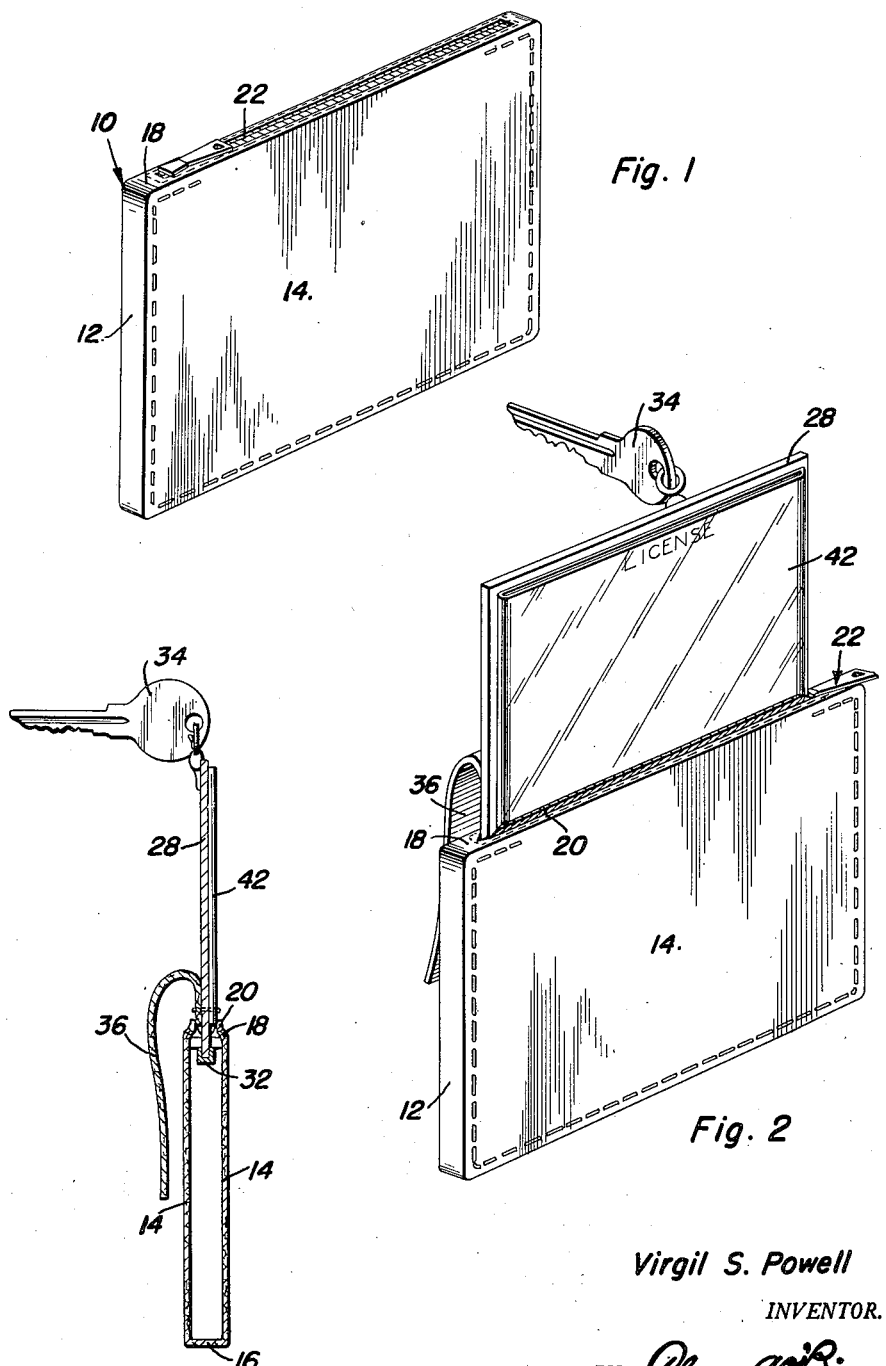
Figure 1 is a perspective view of a satisfactory construction exemplifying the principles of this invention, the same being shown in its closed position.
Figure 2 is a perspective view of the embodiment of Figure 1 but showing the same in its open position.
Figure 3 is a vertical transverse sectional view through the device as illustrated in Figure 2.

The fundamental underlying purpose of this invention is to provide a suitable and satisfactory device for retaining a motor vehicle operator's license card in close association with the motor vehicle ignition key, with a view to simultaneously storing the same in a single container, providing for the simultaneous extension from the container in a position for easy inspection and use. It is contemplated that such an arrangement would effectively enable motor vehicle operators to comply with various requirements of State laws governing the operation of motor vehicles by at all times insuring them that the motor vehicle operator's license will be present at the time the ignition key is employed and will be presented for inspection when the ignition key is in use.

The improved means for retaining the purposes and objects of this invention may be satisfactorily embodied in the manner illustrated in the drawings, wherein the numeral 10 designates generally a suitable receptacle or container which can be of any desired and satisfactory material such as a suitable light weight plastic, a pliable material, such as leather, imitation leather or the like, the invention being specifically adapted to and especially useful with non-rigid materials of the character above mentioned. Conveniently, the container 10 consists of end walls 12 which are joined by side walls 14, a bottom wall 16 and a top wall 18, the latter having an opening in the form of a slot or the like 20 which is adapted to be closed as by a conventional form of slide fastener construction indicated at 22, the latter being of conventional design and since the same in itself forms no part of this invention, further illustration or description is believed to be unnecessary.

In accordance with this invention, and as a particular aid to stiffen, reinforce and strengthen the pliable and nonrigid or light weight material from which the container 10 is fabricated, there are provided elongated strips or members 24 which may be of a suitable plastic or any other inexpensive and satisfactory material. The members 24 preferably extend throughout the entire vertical height of the end walls 12 and are engaged or abutted against the inner surfaces of the same, the bottom edges resting upon the bottom wall 16, while the side edges engage the two side walls 14 and serve to space the same and maintain the desired clearance between these side walls for a purpose which will be later apparent.

At their upper portions, the members 24 are provided with inwardly extending horizontal flange portions 26 which underlie and support the top wall 18, terminating at the edge of the slot or opening 20.

Figure 4:
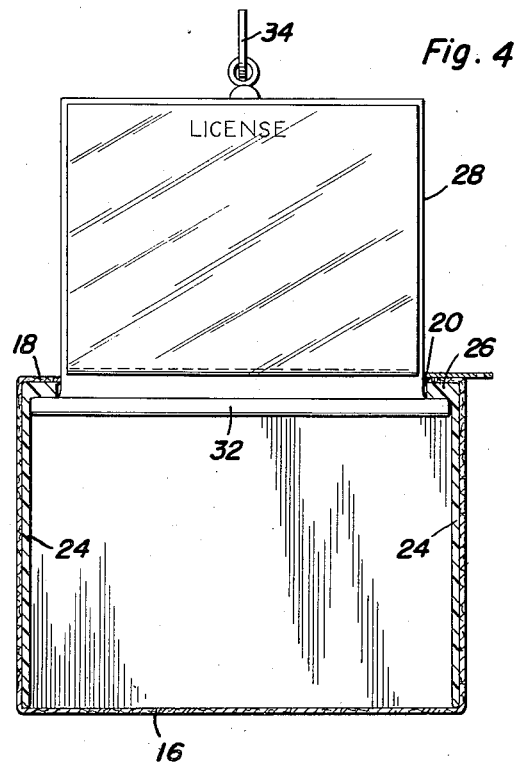
Figure 4 is a vertical longitudinal sectional view through the device as illustrated in Figure 2.
Figure 5:
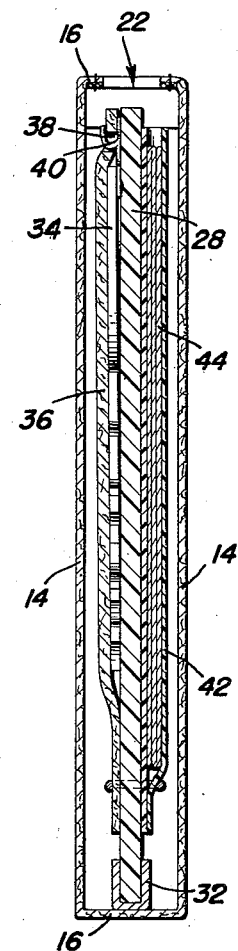
Figure 5 is an enlarged vertical transverse sectional view through the device in the closed position shown in Figure 1; and, Figure 6 is a perspective detail view showing the construction of the sliding panel and associated parts of the invention.
Figure 6:
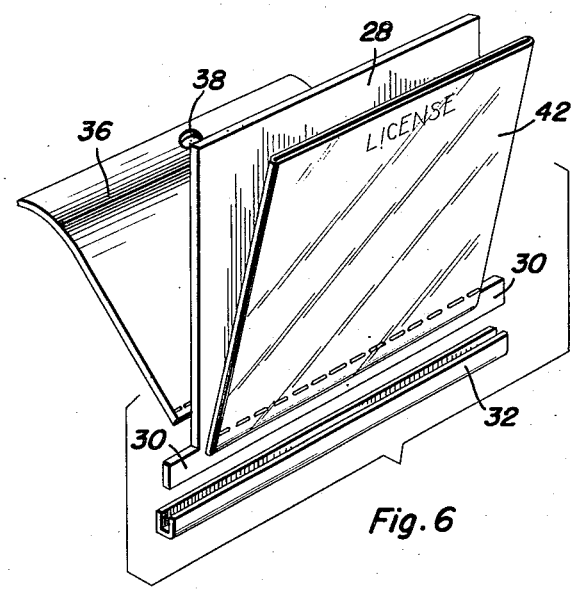

The opening between the adjacent edges of the flanges 26 coincides with and is thus coextensive with the ends of the slot or opening 20, for the reception of and the sliding passage therethrough of a panel assembly. As shown more clearly in Figures 5 and 6, the panel assembly comprises a rigid or semi-rigid sheet or plate 28 of cardboard, plastic or any other suitable material, the same being preferably substantially rectangular but having laterally extending lug portions 30 directed outwardly from opposite sides of the bottom of the side edges of the same. The width of the panel 28 is such that the same will be snugly and slidably received between the adjacent edges of the flanges 26 and the ends of the slot 20, while the lugs or lateral extensions 30 will be slidably received upon the adjacent vertical surfaces of the end members 24 for guiding sliding movement therebetween. The height of the panel assembly is such that when the same is fully retracted into the container 10, as shown in Figure 5, the panel and the elements carried thereby will be completely stored within the container and the slide fastener 22 may satisfactorily close and retain the device in closed position. However, when the slide fastener is opened, the panel assembly may be moved vertically therefrom until the position shown in Figure 4 is attained, at which time the lugs 30 will engage and cooperate with the complementary lugs or flanges 26 of the stiffening elements 24, to thereby extend and present substantially the full surface of the panel and of the elements carried thereby above the top of the container.

Referring again to Figures 5 and 6 in particular, it will be noted that there has been provided a stiffening member for the lower edge portion of the panel 28 and for the lateral extending retaining lugs 30 thereon. This stiffening member may conveniently comprise a channel-shaped member 32 of sheet metal or any other suitable material, the same being of sufficient length and size to substantially completely embrace the lower edge of the panel 28, the laterally extending lugs 30 thereof, and to be coextensive therewith, in order to reinforce and stiffen these elements. Obviously, the ends of the channel member 32 will thus also slide against the adjacent surfaces of the stiffening end members 24, while the upper edges of the end portions of the channel member 32 will likewise abut the under surface of the lugs 26 formed by the flanges on the end members. The reinforcing channel member 32 may be frictionally clamped upon the panel 28 or secured thereto in any other desired manner as will be readily understood.

Swivelly attached in any desired manner to the upper portion of the panel 28 adjacent its middle portion, is an ignition key 34. This key may thus be selectively swiveled and positioned so as to be disposed in flat engagement with the panel 28 as shown in Figure 5, and would be selectively swiveled and moved upwards therefrom in order to insert the key in the ignition lock of the motor vehicle, whereby the key will support the panel in extended position from the container 10, and support the container 10 therefrom as suggested in Figure 2.

In order to facilitate the sliding of the panel assembly including the key into and out of the container 10 without danger of the key scratching or engaging the side of the container and interfering with passage of the panel thereinto and therefrom, a pliable cover sheet 36 is provided, which is stitched or otherwise secured at its lower edge to that side of the panel 28 to which the key 34 is swivelly attached, so that when the key is folded down against the panel, the pliable cover sheet 36 may be folded up over the key, and as shown in Figure 5, may be attached or secured at its upper edge by a suitable aperture 38 to a hook or fastening member 40 carried by the panel 28, as shown in Figure 5.

It will thus be seen that the panel shown may be readily slid into or out of the container 10 through the opening 20 thereof, since the shield 36 will smoothly engage the edge of the opening 20 or the adjacent side wall 14 of the container.

Upon its side opposite that on which the key 34 is secured, the panel 28 is provided with a sheet of transparent material 42 of any desired character, the same being secured at its side edges to form a pocket open at its outer edge and secured at its lower edge to the panel 28 as by stitching or in any other desired manner, to provide a transparent pocket which is open at its upper end for removably receiving an operator's license 44 or any other suitable material. It will thus be seen that whenever the key is withdrawn from the container in order to utilize the same, the license or similar material contained in the transparent pocket will thus be exhibited or displayed.

From the foregoing, it is felt that the operation and construction of the device together with its many advantages as to construction and operation will now be readily apparent and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. A motor vehicle operator's container comprising a receptacle including side and end walls and a top having an opening therethrough, a panel slidable in said receptacle and having its upper portion extensible through said opening, means for swivelly securing a key to the upper portion of said panel for slidable movement therewith through said opening, stiffening members engaging said end walls and spacing said side walls, complementary lugs at the upper ends of said members and on the bottom portion of said panel for limiting passage of the panel through the opening.

2. The combination of claim 1 wherein said panel has a stiffening channel member embracing the lower edge thereof, the ends of said channel member extending laterally beyond the side edges of said panel for sliding engagement with said stiffening members and constituting said panel lugs for abutment with said stiffening member lugs.

3. A motor vehicle operator's container comprising a receptacle including side and end walls and a top having an opening therethrough, a panel slidable in said receptacle and having its upper portion extensible through said opening, means swivelly securing a key to the upper portion of said panel for slidable movement therewith through said opening, a flexible sheet overlying the key and secured to said panel on the lower portion thereof.

VIRGIL S. POWELL.

REFERENCES CITED

The following references are of record in the file of this patent:

UNITED STATES PATENTS

| Number | Name | Date |
|---|---|---|
| 1,583,225 | Flanders | May 4, 1926 |
| 1,766,801 | Ragsdale | June 24, 1930 |
| 2,176,863 | Nash | Oct. 17, 1939 |